(12) United States Patent
Liu et al.

(10) Patent No.: US 11,888,115 B2
(45) Date of Patent: Jan. 30, 2024

(54) ELECTROLYTIC SOLUTION AND LITHIUM METAL BATTERY CONTAINING THE SAME, BATTERY MODULE, BATTERY PACK, AND DEVICE

(71) Applicant: CONTEMPORARY AMPEREX TECHNOLOGY CO., LIMITED, Ningde (CN)

(72) Inventors: Chengyong Liu, Ningde (CN); Yongsheng Guo, Ningde (CN); Chengdu Liang, Ningde (CN); Quan Fan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 226 days.

(21) Appl. No.: 17/550,946

(22) Filed: Dec. 14, 2021

(65) Prior Publication Data
US 2022/0109189 A1 Apr. 7, 2022

Related U.S. Application Data (63) Continuation of application No. PCT/CN2020/112391, filed on Aug. 31, 2020.

(30) Foreign Application Priority Data

Sep. 9, 2019 (CN) .......................... 201910848985.6

(51) Int. Cl.
*H01M 10/0567* (2010.01)
*H01M 10/052* (2010.01)
(Continued)

(52) U.S. Cl.
CPC ....... *H01M 10/0567* (2013.01); *H01M 4/134* (2013.01); *H01M 4/382* (2013.01);
(Continued)

(58) Field of Classification Search
None
See application file for complete search history.

(56) References Cited

U.S. PATENT DOCUMENTS

| | | | |
|---|---|---|---|
| 2013/0337317 A1 | 12/2013 | Shima et al. | |
| 2016/0126592 A1* | 5/2016 | Saito | H01M 10/0569 429/188 |
| 2017/0069935 A1* | 3/2017 | Choi | H01M 10/0568 |

FOREIGN PATENT DOCUMENTS

| | | |
|---|---|---|
| CN | 1543006 A | 11/2004 |
| CN | 1659154 A | 8/2005 |

(Continued)

OTHER PUBLICATIONS

Contemporary Amperex Technology Co., Limited, International Search Report and Written Opinion, PCT/CN2020/112391, dated Dec. 1, 2020, 9 pgs.

(Continued)

*Primary Examiner* — Robert S Carrico
(74) *Attorney, Agent, or Firm* — ANOVA LAW GROUP, PLLC (57) ABSTRACT

This application provides an electrolytic solution and a lithium metal battery containing the electrolytic solution. The electrolytic solution includes a lithium salt, an organic solvent, and an additive. The additive includes a sultam compound represented by Structural Formula I. R is selected from substituted or unsubstituted $C_1$ to $C_{10}$ hydrocarbyls, where a substituent is selected from a phenyl, $C_1$ to $C_6$ alkyls, or $C_1$ to $C_6$ alkenyls. X is a sulfur atom or a phosphorus atom. $R_1$ and $R_2$ each are independently selected from an oxygen atom, a fluorine atom, a chlorine atom, a bromine atom, and substituted or unsubstituted C1 to C10 hydrocarbyls. Both $R_1$ and $R_2$ are not oxygen atoms concurrently.

20 Claims, 3 Drawing Sheets

(51) Int. Cl.
*H01M 10/0569* (2010.01)
*H01M 4/38* (2006.01)
*H01M 4/134* (2010.01)
*H01M 4/40* (2006.01)
*H01M 4/525* (2010.01)

(52) U.S. Cl.
CPC ..... *H01M 10/052* (2013.01); *H01M 10/0569* (2013.01); *H01M 4/405* (2013.01); *H01M 4/525* (2013.01); *H01M 2300/0025* (2013.01)

(56) References Cited

FOREIGN PATENT DOCUMENTS

| | | | |
|---|---|---|---|
| CN | 102893441 A | 1/2013 |
| CN | 103109410 A | 5/2013 |
| CN | 105009347 A | 10/2015 |
| CN | 106415910 A | 2/2017 |
| CN | 106505242 A | 3/2017 |
| CN | 106711504 A | 5/2017 |
| CN | 106920991 A | 7/2017 |
| EP | 2958182 A1 | 12/2015 |
| JP | 2007172990 A | 7/2007 |
| JP | 2011049097 A | 3/2011 |
| JP | 2013206708 A | 10/2013 |
| JP | 2018133332 A | 8/2018 |
| KR | 100570676 B1 | 4/2006 |
| KR | 20160063187 A | 6/2016 |
| WO | WO2021047405 A1 | 3/2021 |

OTHER PUBLICATIONS

The China National Intellectual Property Administration (CNIPA) The First Office Action for Chinese Application 202110982984.8 10 Pages (With Translation).
The China National Intellectual Property Administration (CNIPA) First Search of Family Application 202110982984.8 1 Pages (With Translation).
The China National Intellectual Property Administration (CNIPA) First Search of Priority Application 2019108489856 2 Pages (With Translation).
The China National Intellectual Property Administration (CNIPA) Supplementary Search of Family Application 202110982984.8 1 Pages (With Translation).
The European Patent Office (EPO) Decision to Grant a European patent for EP Application No. 20863225.7 dated Apr. 28, 2023 1 Pages.
The European Patent Office (EPO) Communication under Rule 71(3) for EP Application No. 20863225.7 dated Mar. 13, 2023 5 Pages.
The European Patent Office (EPO) Extended Search Report for EP Application No. 20863225.7 dated Aug. 25, 2022 3 Pages.
The Chinese Patent Office (CPO) Notification to Grant Patent Right for Invention for CN Application No. 202110982984.8 dated Aug. 25, 2022 3 Pages (including English translation).
The Chinese Patent Office (CPO) Notification to Grant Patent Right for Invention for CN Application No. 201910848985.6 dated Jul. 21, 2021 3 Pages (including English translation).
The Chinese Patent Office (CPO) Supplementary Search of priority application for CN2021109829848 dated Aug. 3, 2022 1 page.

* cited by examiner

ELECTROLYTIC SOLUTION AND LITHIUM METAL BATTERY CONTAINING THE SAME, BATTERY MODULE, BATTERY PACK, AND DEVICE

CROSS-REFERENCE TO RELATED APPLICATIONS

This application is a continuation application of PCT Patent Application No. PCT/CN2020/112391, entitled "ELECTROLYTE AND LITHIUM METAL BATTERY COMPRISING ELECTROLYTE, BATTERY MODULE, BATTERY PACK, AND APPARATUS" filed on Aug. 31, 2020, which claims priority to Chinese Patent Application No. 201910848985.6, filed on Sep. 9, 2019 and entitled "ELECTROLYTIC SOLUTION AND LITHIUM METAL BATTERY CONTAINING THE SAME", both of which are incorporated herein by reference in their entirety.

TECHNICAL FIELD

This application relates to the technical field of lithium batteries, and in particular, to an electrolytic solution and a lithium metal battery containing the same, a battery module, a battery pack, and a device.

BACKGROUND

Currently, lithium-ion batteries have been widely used in technical products such as vehicles and mobile phones. Commercial lithium-ion batteries mainly use graphite as a negative electrode material. The capacity that the material has exerted is already close to a theoretical value of graphite (372 mAh/g). Therefore, it is difficult to significantly enhance the capacity of a lithium-ion battery by processing the graphite. Metallic lithium has a theoretical specific capacity of up to 3,860 mAh/g, and an electrode potential as low as −3.04 V (relative to $H_2/H^+$). Therefore, scientific researchers are considering how to develop a lithium metal battery using metallic lithium as a negative electrode. However, the development of lithium metal batteries is bottlenecked by two main factors: (1) a lithium metal battery is likely to produce lithium dendrites during cycles, and the lithium dendrites are likely to penetrate the separator of the battery and cause a short circuit of the battery; and (2) the lithium dendrites have a large surface area and a high activity, and are likely to react violently with an electrolytic solution. The violent reaction causes a solid electrolyte interphase (SEI) film on a surface of the lithium metal to restructure continuously, consumes the electrolytic solution and active lithium, reduces cycle efficiency, and shortens a cycle life of the battery. Therefore, how to effectively improve surface properties of a metallic lithium electrode and suppress formation of the lithium dendrites is a linchpin of further development of the lithium metal batteries.

SUMMARY

In view of the problems in the background technologies, an objective of this application is to provide an electrolytic solution and a lithium metal battery containing the electrolytic solution, a battery module, a battery pack, and a device, which can effectively improve surface properties of a metallic lithium electrode and suppress generation of lithium dendrites.

To achieve the objectives of this application, the electrolytic solution provided in this application includes a lithium salt, an organic solvent, and an additive. The additive includes a sultam compound represented by Structural Formula I:

Structural Formula I where
R is selected from substituted or unsubstituted $C_1$ to $C_{10}$ hydrocarbyls, where a substituent is selected from a phenyl, $C_1$ to $C_6$ alkyls, or $C_1$ to $C_6$ alkenyls;
X is a sulfur atom or a phosphorus atom; and
$R_1$ and $R_2$ each are independently selected from an oxygen atom, a fluorine atom, a chlorine atom, a bromine atom, and substituted or unsubstituted $C_1$ to $C_{10}$ hydrocarbyls, where a substituent contains one or more of elements fluorine, chlorine, bromine, iodine, nitrogen, oxygen, sulfur, silicon, boron, and phosphorus; and both $R_1$ and $R_2$ are not oxygen atoms concurrently.

Compared with the prior art, this application achieves at least the following beneficial effects:

1. The sultam compound additive added in this application can generate $SO_2$ gas in situ when encountering trace moisture in a battery system. Then an in situ micro reaction occurs between $SO_2$ and a lithium metal negative electrode to form a sulfur-containing inorganic acid salt, thereby improving surface composition and inorganic properties of the lithium metal and enhancing cycle performance of the lithium metal battery.
2. The sultam compound used as an additive in the electrolytic solution according to this application contains a sulfonyl group, and can form an electrolyte interface film on surfaces of both the positive electrode and the negative electrode, where the film is formed from substances such as sulfate, sulfonate lithium salt, and polysulfonimide. The electrolyte interface film formed in this way is of high ion conductivity, which helps to reduce the resistance of the battery, and suppresses excessive side reactions between the positive and negative electrodes and the electrolytic solution, thereby improving cycle performance of the battery.

In any of the foregoing embodiments, the additive includes a sultam compound represented by Structural Formula I-1:

Structural Formula I-1 where, X is a phosphorus atom, and $R_1$ and $R_2$ each are independently selected from F, Cl, Br, or halogenated $C_1$ to $C_4$ hydrocarbyls,
or X is a sulfur atom, $R_2$ is an oxygen atom, and $R_1$ is selected from F, Cl, Br, or halogenated or unsubstituted $C_1$ to $C_4$ hydrocarbyls; and
n is 1, 2, 3, or 4.

When the sultam compound falls within the specified range, interface composition on the surface of the lithium metal negative electrode is effectively improved, growth of lithium dendrites is effectively suppressed during cycles of the battery, and the cycle performance of the battery is further improved.

In any of the foregoing embodiments, the additive includes a sultam compound represented by Structural Formula I-1:

Structural Formula I-1 where, X is a phosphorus atom, and $R_1$ and $R_2$ each are independently selected from F, Cl, Br, or halogenated $C_1$ to $C_4$ hydrocarbyls, or X is a sulfur atom, $R_2$ is an oxygen atom, and $R_1$ is selected from F, Cl, Br, or halogenated $C_1$ to $C_4$ hydrocarbyls; and n is 1, 2, or 3.

When the sultam compound falls within the specified range, the interface composition on the surface of the lithium metal negative electrode is effectively improved, and the cycle performance of the battery is further improved.

In any of the foregoing embodiments, X is a phosphorus atom, and $R_1$ or $R_2$ is selected from F, —$CH_3$, —$C_2H_5$, —$C_3H_7$, —$C_4H_9$, —$CF_3$, —$C_2F_5$, linear —$C_3F_7$, linear —$C_4F_9$, —$CH_2CF_3$, and —$CH(CF_3)_2$; or X is a sulfur atom, $R_2$ is an oxygen atom, and $R_1$ is selected from F, —$CH_3$, —$C_2H_5$, —$C_3H_7$, —$C_4H_9$, —$CF_3$, —$C_2F_5$, linear —$C_3F_7$, linear —$C_4F_9$, —$CH_2CF_3$, and —$CH(CF_3)_2$.

When $R_1$ and $R_2$ fall within the specified range, the cycle performance of the battery is further improved.

In any of the foregoing embodiments, X is a sulfur atom, R is —$CH_2CH_2$— or —$CH(Ph)CH_2$—, $R_2$ is an oxygen atom, and $R_1$ is F or Cl; or X is a phosphorus atom, R is —$CH_2CH_2$—, and $R_1$ and $R_2$ each are independently selected from F.

When X, R, $R_1$, and $R_2$ fall within the specified range, the cycle performance of the battery is further improved while a high energy density is achieved concurrently.

In any of the foregoing embodiments, based on a total mass of the electrolytic solution, a mass percent of the sultam compound in the electrolytic solution is 0.5% to 15%, and in some embodiments, 3% to 10%.

When the mass percent of the sultam compound in the electrolytic solution falls within the specified range, the surface properties of the lithium metal are effectively improved, and the cycle performance of the battery is further improved.

In any of the foregoing embodiments, based on the total mass of the electrolytic solution, a ratio of a content of the sultam compound to a content of the lithium salt is 0.04 to 0.06, the content of the sultam compound is measured by a mass percent; and the content of the lithium salt is measured by a molar concentration.

When the content of the sultam compound and the content of the lithium salt fall within the specified ranges, the energy density and the cycle performance of the battery are further improved.

In any of the foregoing embodiments, the electrolytic solution further contains a film-forming additive, and in some embodiments, the film-forming additive is fluoroethylene carbonate.

When the electrolytic solution further contains the film-forming additive, further improvement of the cycle performance of the battery is facilitated.

In any of the foregoing embodiments, a ratio of a content C1 of the sultam compound, a content C2 of the fluoroethylene carbonate, and a content L of the lithium salt satisfies the following relational expression:

$$38 \leq L(C1+C2)/C1C2 \leq 42;$$

where, C1 and C2 are measured by mass percent; and

L is measured by a molar concentration.

When the ratio of the content C1 of the sultam compound, the content C2 of the fluoroethylene carbonate, and the content L of the lithium salt falls within the specified range, the cycle performance of the battery is further improved.

This application further provides a lithium metal battery, including a positive electrode, an electrolytic solution, a negative electrode, and a separator located between the positive electrode and the negative electrode. The electrolytic solution is the electrolytic solution described above, and the negative electrode includes a lithium-containing metal material.

The lithium metal battery contains the foregoing electrolytic solution, and therefore, its energy density and cycle performance are improved.

In any of the foregoing embodiments, the lithium-containing metal material is metallic lithium or a lithium alloy.

When the lithium-containing metallic material is metal lithium or a lithium alloy, the cycle performance of the battery is further improved.

In any of the foregoing embodiments, the lithium alloy includes one or more of a Li—Sn alloy, a Li—Sn—O alloy, a Li—Mg alloy, a Li—B alloy, and a Li—Al alloy.

When the lithium alloy falls within the specified range, the sultam compound is more effective in improving the surface properties of the lithium negative electrode, thereby further improving the cycle performance of the battery.

In any of the foregoing embodiments, a moisture content in the positive electrode plate is 1 mg/Ah to 100 mg/Ah, and a molar ratio of the sultam compound in the electrolytic solution to moisture in the positive electrode plate is 0.1:1 to 10:1, and in some embodiments, 0.5:1 to 2:1.

When the molar ratio of the sultam compound in the electrolytic solution to the moisture in the positive electrode plate falls within the specified range, the sultam additive can be converted into $SO_2$ advantageously, the surface composition of the lithium metal is improved, and the cycle performance of the battery is further improved.

In any of the foregoing embodiments, the molar ratio of the sultam compound in the electrolytic solution to the moisture in the positive electrode plate is 0.8:1 to 1.2:1.

When the molar ratio of the sultam compound in the electrolytic solution to the moisture in the positive electrode plate falls within the specified range, the cycle performance of the battery is further improved.

In any of the foregoing embodiments, an injection volume of the electrolytic solution is 0.5 g/Ah to 5 g/Ah, and in some embodiments, 1 g/Ah to 3 g/Ah.

When the injection volume of the electrolytic solution falls within the specified range, the energy density and the cycle performance of the battery are further improved.

In any of the foregoing embodiments, the injection volume of the electrolytic solution is 2 g/Ah to 3 g/Ah.

When the injection volume of the electrolytic solution falls within the specified range, the cycle performance of the battery is further improved.

In any of the foregoing embodiments, an electrolyte interface film on a surface of the lithium-containing metal material contains sulfate, sulfonate lithium salt, and polysulfonimide.

When the electrolyte interface film on the surface of the lithium-containing metal material contains sulfate, sulfonate lithium salt, and polysulfonimide, a trade-off between ion conductivity and toughness is achieved, stability of the interface is enhanced, and the cycle performance of the battery is further improved.

In any of the foregoing embodiments, the positive electrode includes a positive active material, and the positive active material is a lithium transition metal composite oxide, and in some embodiments, is $LiNi_{0.8}Co_{0.1}Mn_{0.1}O_2$, $LiFePO_4$, $LiCoO_2$, or $LiNi_{0.8}Co_{0.5}Al_{1.5}O_2$.

When the positive active material falls within the specified range, the cycle performance of the battery is further improved.

This application further provides a battery module containing the lithium metal battery.

This application further provides a battery pack containing the battery module.

This application further provides a device containing the lithium metal battery.

The battery module, the battery pack, and the device according to this application contain the lithium metal battery provided in this application, and therefore, have at least the same advantages as the lithium metal battery.

BRIEF DESCRIPTION OF DRAWINGS

To describe the technical solutions in the embodiments of this application more clearly, the following outlines the drawings used in the embodiments of this application. Apparently, the drawings outlined below are merely a part of embodiments of this application. A person of ordinary skill in the art may derive other drawings from the outlined drawings without making any creative efforts.

DETAILED DESCRIPTION OF EMBODIMENTS

The following describes in detail an electrolytic solution, a lithium metal battery, a battery module, a battery pack, and a device according to this application.

The electrolytic solution provided in this application includes a lithium salt, an organic solvent, and an additive. The additive includes a sultam compound represented by Structural Formula I:

Structural Formula I where
R is selected from substituted or unsubstituted $C_1$ to $C_{10}$ hydrocarbyls, where a substituent is selected from a phenyl, $C_1$ to $C_6$ alkyls, or $C_1$ to $C_6$ alkenyls;
X is a sulfur atom or a phosphorus atom; and
$R_1$ and $R_2$ each are independently selected from an oxygen atom, a fluorine atom, a chlorine atom, a bromine atom, and substituted or unsubstituted $C_1$ to $C_{10}$ hydrocarbyls, where a substituent contains one or more of elements fluorine, chlorine, bromine, iodine, nitrogen, oxygen, sulfur, silicon, boron, and phosphorus; and
both $R_1$ and $R_2$ are not oxygen atoms concurrently.

In an implementation solution of the electrolytic solution according to this application, the additive includes a sultam compound represented by Structural Formula I-1:

Structural Formula I-1 where, X is a phosphorus atom, and $R_1$ and $R_2$ each are independently selected from F, Cl, Br, or halogenated $C_1$ to $C_4$ hydrocarbyls,
or, X is a sulfur atom, $R_2$ is an oxygen atom, and $R_1$ is selected from F, Cl, Br, or halogenated or unsubstituted $C_1$ to $C_4$ hydrocarbyls; and
n is 1, 2, 3, or 4.

In an implementation solution of the electrolytic solution according to this application, the additive includes a sultam compound represented by Structural Formula I-1:

Structural Formula I-1 where, X is a phosphorus atom, and $R_1$ and $R_2$ each are independently selected from F, Cl, Br, or halogenated $C_1$ to $C_4$ hydrocarbyls,
or X is a sulfur atom, $R_2$ is an oxygen atom, and $R_1$ is selected from F, Cl, Br, or halogenated $C_1$ to $C_4$ hydrocarbyls; and
n is 1, 2, or 3.

In some embodiments, in the sultam compound additive added in the electrolytic solution according to this application, X is a phosphorus atom, and $R_1$ or $R_2$ is selected from F, $—CH_3$, $—C_2H_5$, $—C_3H_7$, $—C_4H_9$, $—CF_3$, $—C_2F_5$, linear $—C_3F_7$, linear $—C_4F_9$, $—CH_2CF_3$, and $—CH(CF_3)_2$; or X is a sulfur atom, $R_2$ is an oxygen atom, and $R_1$ is selected from F, $—CH_3$, $—C_2H_5$, $—C_3H_7$, $—C_4H_9$, $—CF_3$, $—C_2F_5$, linear —$C_3F_7$, linear —$C_4F_9$, —$CH_2CF_3$, and —$CH(CF_3)_2$. During cycles of the battery, such fluorine-containing substituents can generate LiF. A trace amount of LiF improves the performance of the lithium metal battery.

In some embodiments, in the sultam compound additive added in the electrolytic solution according to this application, X is a sulfur atom, R is —$CH_2CH_2$— or —$CH(Ph)CH_2$—, $R_2$ is an oxygen atom, and $R_1$ is F or Cl; or X is a phosphorus atom, R is —$CH_2CH_2$—, and $R_1$ and $R_2$ each are independently selected from F.

In some embodiments, based on a total mass of the electrolytic solution, a mass percent of the sultam compound in the electrolytic solution is 0.5% to 15%, for example, 3% to 10%. In the lithium metal battery according to this application, if the mass percent of the sultam compound additive added in the electrolytic solution is too low, the content of $SO_2$ gas generated during operation of the lithium metal battery is too low to effectively improve the surface properties of the lithium metal. If the content of the sultam compound additive is too high, viscosity of the electrolyte system will increase and affect lithium ion conduction inside the battery.

As an improvement of the electrolytic solution according to this application, other additives applicable to improving the performance of lithium metal batteries, which are known to a person skilled in the art, may be added into the electrolytic solution, for example, an SEI film-forming additive, a flame retardant additive, and an anti-overcharge additive, and a conductive additive. A person skilled in the art may add such additives as required.

In some embodiments, the electrolytic solution according to this application further includes a film-forming additive, such as fluoroethylene carbonate (FEC).

In some embodiments, the organic solvent may be at least one of carbonate, carboxylate, sulfate, phosphate, amide, nitrile, and ether. For example, the organic solvent may be one or more of ethylene carbonate (also known as ethylene glycol carbonate), propylene carbonate (also known as propylene glycol carbonate), dimethyl carbonate, diethyl carbonate, dipropylene carbonate, ethyl methyl carbonate, methyl formate, ethyl formate, ethyl propionate, propyl propionate, methyl butyrate, ethyl acetate, acid anhydride, N-methyl-pyrrolidone, N-methyl formamide, N-methyl acetamide, acetonitrile, sulfolane, dimethyl sulfoxide, ethylene sulfite, propylene sulfite, triethyl phosphate, methyl ethyl phosphite, methyl sulfide, diethyl sulfite, dimethyl sulfite, ethylene glycol dimethyl ether, diethylene glycol dimethyl ether, triethylene glycol dimethyl ether, tetraethylene glycol dimethyl ether, 1,3-dioxolane, tetrahydrofuran, fluorine-containing cyclic organic ester, and sulfur-containing cyclic organic ester. The mass percent of the organic solvent in the electrolytic solution may be 60% to 90%.

In some embodiments, the lithium salt is any one or more of an organic lithium salt and an inorganic lithium salt. For example, the lithium salt is at least one of $LiPF_6$, $LiBF_4$, LiTFSI, $LiClO_4$, $LiAsF_6$, LiBOB, LiDFOB, LiTFOP, $LiN(SO_2R_F)_2$, $LiN(SO_2F)(SO_2R_F)$, where the substituent $R_F=C_nF_{2n+1}$, and n is an integer from 1 to 10. In some embodiments, a concentration of the lithium salt in the electrolytic solution is 0.5 mole/liter (mol/L) to 10 mol/L, for example, 1 mol/L to 5 mol/L.

In some Embodiments, based on the total mass of the electrolytic solution, a ratio of the content of the sultam compound to the content of the lithium salt is 0.04 to 0.06, where the content of the sultam compound is measured by a mass percent (such as 0.5 wt % to 15 wt %), and the content of the lithium salt is measured by a molar concentration (mol/L).

In some embodiments, a ratio of the content C1 of the sultam compound, the content C2 of the fluoroethylene carbonate, and the content L of the lithium salt satisfies the following relational expression:

$$38 \leq L(C1+C2)/C1C2 \leq 42;$$

where, C1 and C2 are measured by mass percent (for example, the content of the sultam compound is 0.5 wt % to 15 wt %); and L is measured by a molar concentration (mol/L).

Another aspect of this application provides a lithium metal battery, including a positive electrode, an electrolytic solution, a negative electrode, and a separator located between the positive electrode and the negative electrode. The electrolytic solution is the electrolytic solution according to the first aspect of this application, and the negative electrode includes a lithium-containing metal material. The lithium-containing metal material is metallic lithium or a lithium alloy. The lithium alloy includes one or more of a Li—Sn alloy, a Li—Sn—O alloy, a Li—Mg alloy, a Li—B alloy, and a Li—Al alloy. It needs to be particularly noted that the sultam compound not only reacts with the lithium metal in situ, but also reacts with another substance in the lithium alloy, thereby being more effective in improving the surface properties of the lithium negative electrode.

In the lithium metal battery according to this application, the positive electrode plate contains a trace amount of moisture. A molar ratio of the sultam compound additive in the electrolytic solution to the moisture in the positive electrode plate is 0.1:1 to 10:1, and further, the molar ratio is 0.5:1 to 2:1. In the lithium metal battery according to this application, if the moisture content in the positive electrode plate is too low, it is difficult to induce decomposition of the sultam compound additive to form $SO_2$ gas. On the other hand, if the moisture content in the positive electrode plate is too high, a hydrolysis reaction of the electrolytic solution may occur, or the positive electrode material may deteriorate drastically, and therefore, the performance of the lithium metal battery may deteriorate drastically. In this application, an appropriate moisture content in the positive electrode plate is 1 milligram ampere-hour (mg/Ah) to 100 mg/Ah.

In some embodiments, the molar ratio of the sultam compound in the electrolytic solution to the moisture in the positive electrode plate is 0.8:1 to 1.2:1.

In the lithium metal battery according to this application, the positive electrode includes a positive current collector and a positive active material layer disposed on at least one surface of the positive current collector. For example, the positive current collector includes two surfaces opposite to each other in a thickness direction. The positive active material layer is stacked on either or both of the two surfaces of the positive current collector.

The positive active material layer contains a positive active material that enables reversible deintercalation/intercalation of lithium ions during operation. The type of the positive active material is not particularly limited, and may be any positive active material known in the art for use in a lithium-ion secondary battery. For example, the positive active material may be a lithium transition metal composite oxide, where the transition metal may be one or more of Mn, Fe, Ni, Co, Cr, Ti, Zn, V, Al, Zr, Ce, and Mg. The lithium transition metal composite oxide is, for example, one or more of $LiMn_2O_4$, $LiNiO_2$, $LiCoO_2$, $LiNi_{1-y}Co_yO_2$ (0<y<1), $LiNi_mCo_nAl_{1-m-n}O_2$ (0<m<1, 0≤n<1, 0<m+n<1), $LiNi_s$-

Co$_t$Mn$_{1-s-t}$O$_2$ (0<s<1, 0≤t<1, 0<s+t<1), LiMPO$_4$ (M may be one or more of Fe, Mn, and Co), and Li$_3$V$_2$(PO$_4$)$_3$. The lithium transition metal composite oxide may be further doped with elements of a high electronegativity, for example, one or more of S, N, F, Br, Cl, and I. The lithium transition metal composite oxide may undergo coating modification. The doping and/or coating modification enable the compound to have a more stable structure and higher electrochemical performance.

In some embodiments of the lithium metal battery according to this application, the positive active material layer includes a positive active material represented by general formula (1):

Formula (1)

In Formula (1), −0.1≤x≤0.2, 0<a<1, 0≤b<1, 0<a+b<1, 0≤y<0.2, M is one or more of Mn, Fe, Cr, Ti, Zn, V, Al, Zr, and Ce, and A is one or more of S, N, F, Cl, Br, and I.

Further, in Formula (1), 0.5≤b<1. Furthermore, in Formula (1), 0.5≤b<1, M is one or both of Mn and Al, and A is one or both of S and F.

In some embodiments, the positive active material is LiNi$_{0.8}$Co$_{0.1}$Mn$_{0.1}$O$_2$ (NCM811), LiFePO$_4$, LiCoO$_2$, or LiNi$_{0.8}$Co$_{0.5}$Al$_{1.5}$O (NCA).

In addition, the positive active material layer may further include a conductive agent and a binder. The types of the conductive agent and the binder in the positive active material are not limited in this embodiment, and may be selected according to actual needs. For example, the conductive agent may be one or more of graphite, superconducting carbon, acetylene black, carbon black, Ketjen black, carbon dots, carbon nanotubes, graphene, and carbon nanofibers; and the bonding agent may be one or more of (SBR), water-based acrylic resin (water-based acrylic resin), carboxymethyl cellulose (CMC), polyvinylidene fluoride (PVDF), polytetrafluoroethylene (PTFE), polyvinyl butyral (PVB), ethylene-vinyl acetate copolymer (EVA), and polyvinyl alcohol (PVA).

The positive current collector is configured to collect and conduct current. The positive current collector may be a metal foil or a porous metal sheet, for example, a foil or a porous plate of metals such as aluminum, copper, nickel, titanium, or silver, or an alloy thereof, such as aluminum foil.

The positive electrode plate may be prepared by coating. For example, a method for preparing the positive electrode plate includes: mixing a positive active material, a binder, a conductive agent, and an organic solvent (such as N-methylpyrrolidone (NMP)) at a preset ratio, stirring the mixture into a homogeneous system to form a positive slurry, and coating a positive current collector with the positive slurry; and performing steps such as drying and calendering to make a positive electrode plate.

The negative electrode is a sheet of a lithium-containing metal material, and may be a lithium alloy sheet or a metal lithium sheet. The lithium alloy is, for example, one or more of a Li—Sn alloy, a Li—Sn—O alloy, a Li—Mg alloy, a Li—B alloy, and a Li—Al alloy.

The separator of the lithium metal battery according to this application is not particularly limited, and may be any well-known porous-structured separator that is electrochemically stable and chemically stable, for example, may be a single-layer or multi-layer film that is one or more of glass fiber, non-woven fabric, polyethylene (PE), polypropylene (PP), and polyvinylidene difluoride (PVDF). The positive electrode and the negative electrode are alternately stacked. The separator is arranged between the positive electrode and the negative electrode to separate the positive electrode from the negative electrode. In this way, a battery cell is obtained. Alternatively, such materials are wound to form a battery cell. The battery cell is placed in a housing, the electrolytic solution is injected into the housing, and the housing is sealed to obtain a lithium metal battery.

The injection volume of the electrolytic solution is related to the capacity of the battery. In this application, the injection volume of the electrolytic solution is 0.5 gram per ampere hour (g/Ah) to 5 g/Ah. In some embodiments, the injection volume is 1 g/Ah to 3 g/Ah, for example, 2 g/Ah to 3 g/Ah. If the injection amount of the electrolytic solution is too low, and the electrolytic solution is consumed too quickly, thereby shortening the battery life. If the injection volume is too high, inactive electrolytic solution in the battery accounts for a high proportion of the total weight of the battery, thereby reducing the energy density of the battery.

In some embodiments, the electrolytic solution according to this application includes a lithium salt, an organic solvent, a sultam compound additive, and in some embodiments, other additives. The sultam compound is represented by Structural Formula I. In Structural Formula I, X is a sulfur atom, R is —CH$_2$CH$_2$—, —CH$_2$CH$_2$CH$_2$—, or —CH(Ph)CH$_2$—, R$_2$ is an oxygen atom, and R$_1$ is F or Cl; or, X is a phosphorus atom, R is —CH$_2$CH$_2$— or —CH$_2$CH$_2$CH$_2$—, and R$_1$ and R$_2$ each are independently selected from —CF$_3$ or F. Based on a total mass of the electrolytic solution, a mass percent of the sultam compound in the electrolytic solution is 4% to 6%. The lithium salt is LiPF$_6$. The positive active material is NCM811 or NCA. The moisture content in the positive electrode plate is 6 mg/Ah to 10 mg/Ah. A molar ratio of the sultam compound in the electrolytic solution to the moisture in the positive electrode plate is 0.8:1 to 1.2:1. Other additives are FEC.

In some embodiments, the electrolytic solution according to this application includes a lithium salt, an organic solvent, a sultam compound additive, and in some embodiments, other additives. The sultam compound is represented by Structural Formula I. In Structural Formula I, X is a sulfur atom, R is —CH$_2$CH$_2$— or —CH(Ph)CH$_2$—, R$_2$ is an oxygen atom, and R$_1$ is F or Cl; or, X is a phosphorus atom, R is —CH$_2$CH$_2$—, and R$_1$ and R$_2$ each are independently selected from F. Based on the total mass of the electrolytic solution, the mass percent of the sultam compound in the electrolytic solution is 4% to 6%. The lithium salt is LiPF$_6$. The positive active material is NCM811. The moisture content in the positive electrode plate is 6 mg/Ah to 10 mg/Ah. The molar ratio of the sultam compound in the electrolytic solution to the moisture in the positive electrode plate is 0.8:1 to 1.2:1. Other additives are FEC.

After the electrolytic solution is injected in the lithium metal battery, due to a series of physical and chemical reactions between the electrolytic solution and the negative electrode of the lithium metal battery, an electrolyte interface film is finally formed on the surface of the lithium-containing metal material. The electrolyte interface film contains at least one of sulfate, lithium sulfonate, and polysulfonimide. In some embodiments, the electrolyte interface film is an interface film that contains sulfate, lithium sulfonate, and polysulfonimide, that is, an interface film that contains both an inorganic compound and an organic compound concurrently. Such an electrolyte interface film achieves a trade-off between ion conductivity and toughness, and can improve the stability of the interface film.

Figure 1:
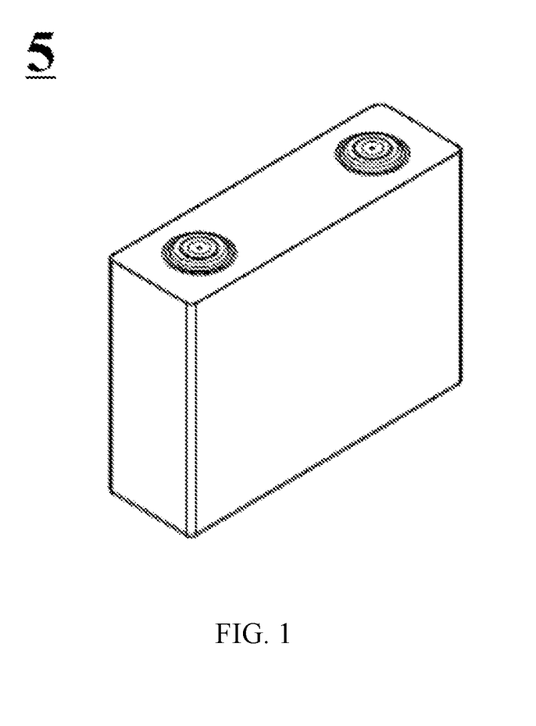
FIG. 1 is a schematic diagram of a lithium metal battery according to an embodiment.

The shape of the lithium metal battery is not particularly limited in this application, and may be cylindrical, prismatic or any other shape. FIG. 1 shows a prismatic lithium metal battery 5 as an example.

In some embodiments, the lithium metal batteries may be assembled into a battery module. The quantity of the lithium metal batteries contained in a battery module may be plural, and may be adjusted according to the use and capacity of the battery module.

Figure 2:
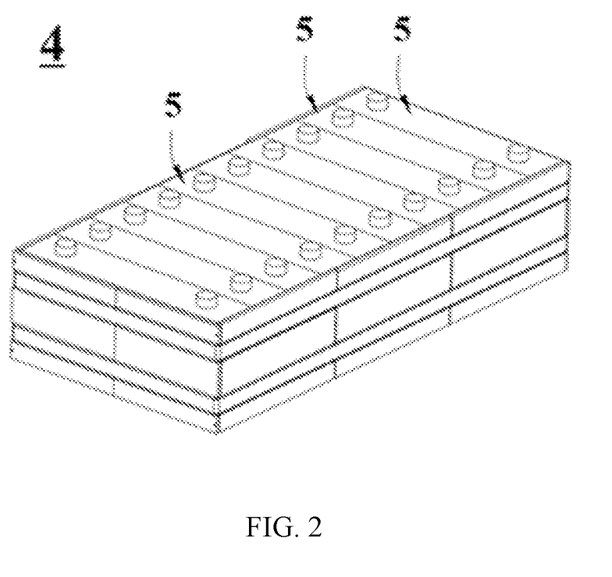
FIG. 2 is a schematic diagram of a battery module according to an embodiment.

FIG. 2 shows a battery module 4 as an example. Referring to FIG. 2, in the battery module 4, a plurality of lithium metal batteries 5 may be arranged sequentially along a length direction of the battery module 4. Nevertheless, the secondary batteries may also be arranged in any other manner. Further, the plurality of lithium metal batteries 5 may be fixed by a fastener.

In some embodiments, the battery module 4 may further include a housing that forms an accommodation space. A plurality of lithium metal batteries 5 are accommodated in the accommodation space.

In some embodiments, the battery module may be assembled into a battery pack. The quantity of the battery modules contained in a battery pack may be adjusted according to the application and capacity of the battery pack.

Figure 3:
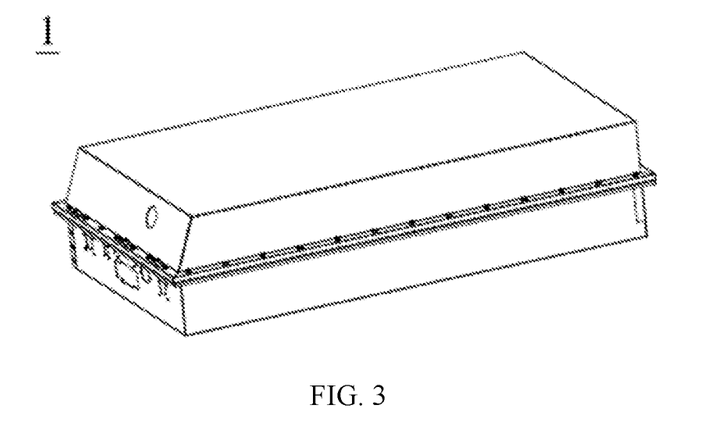
FIG. 3 is a schematic diagram of a battery pack according to an embodiment.
Figure 4:
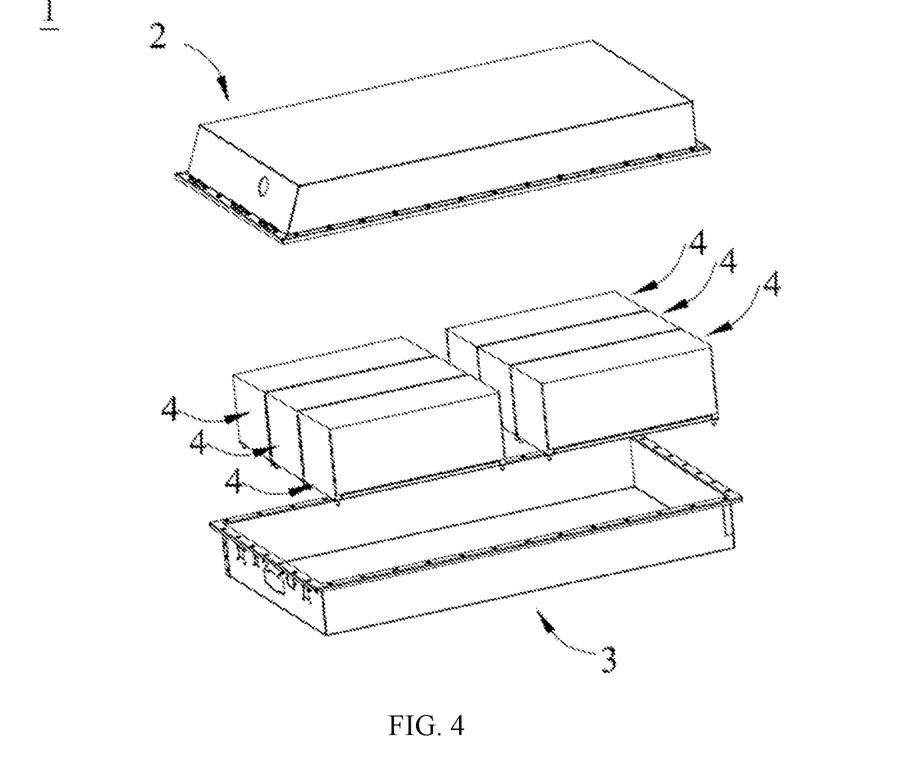
FIG. 4 is an exploded view of FIG. 3.

FIG. 3 and FIG. 4 shows a battery pack 1 as an example. Referring to FIG. 3 and FIG. 4, the battery pack 1 may include a battery box and a plurality of battery modules 4 contained in the battery box. The battery box includes an upper box 2 and a lower box 3. The upper box 2 fits the lower box 3 to form a closed space for accommodating the battery module 4. The plurality of battery modules 4 may be arranged in the battery box in any manner.

The following describes a device according to this application.

A fifth aspect of this application provides a device. The device includes the lithium metal battery according to the second aspect of this application. The lithium metal battery may provide a power supply to the device, or may serve as an energy storage unit of the device. The device may be, but is not limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

A lithium metal battery, a battery module, or a battery pack may be selected for use in the device according to use requirements.

Figure 5:
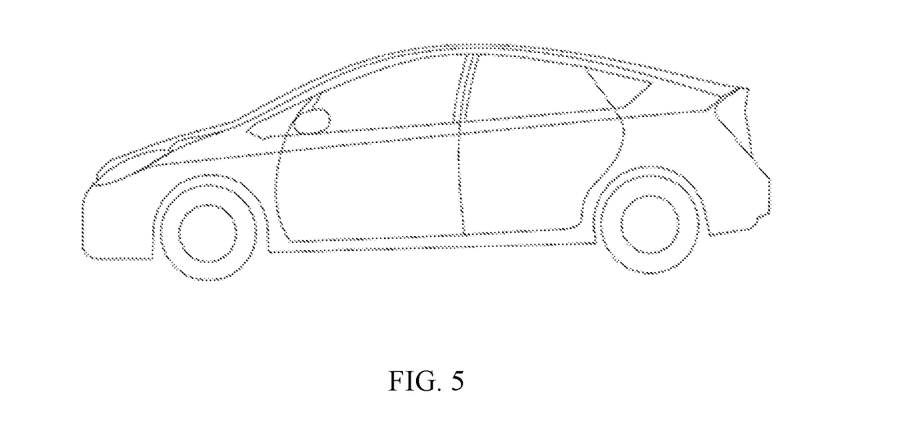
FIG. 5 is a schematic diagram of a device using a lithium metal battery as a power supply according to an embodiment.

FIG. 5 shows a device as an example. The device may be battery electric vehicle, a hybrid electric vehicle, a plug-in hybrid electric vehicle, or the like. To meet the requirements of the device for a high power and a high energy density of the lithium metal battery, a battery pack or a battery module may be adopted in the device.

In another example, the device may be a mobile phone, a tablet computer, a notebook computer, or the like. The device is generally required to be thin and light, and may use a lithium metal battery as a power supply.

Embodiment 1

(1) Preparing an Electrolytic Solution

A method for preparing an electrolytic solution includes: in the drying room, mixing ethylene carbonate (EC for short) and diethyl carbonate (DEC for short) at a volume ratio of EC:DEC=1:1, and stirring the mixture well to obtain an organic solvent; and adding conductive lithium salt LiPF$_6$ and N-fluorosulfonyl-5-oxo-sultam (represented by Structural Formula II) as an additive into the organic solvent to obtain an electrolytic solution in which the mass percent of the N-fluorosulfonyl-5-oxo-sultam as an additive is 5% and in which the concentration of LiPF$_6$ is 1 mol/L.

Structural Formula 2

(2) Preparing a Positive Electrode Plate

A method for preparing a positive electrode plate includes: mixing lithium nickel cobalt manganese oxide (LiNi$_{0.8}$Co$_{0.1}$Mn$_{0.1}$O$_2$, NCM811) as a positive active material, a binder (PVDF), and a conductive agent (acetylene black) at a mass ratio of 98:1:1, adding N-methyl-pyrrolidone (NMP) solvent until the system becomes homogeneous and transparent, and stirring with a vacuum mixer to make an electrode active slurry; coating a current collector aluminum foil (12 μm thick) evenly with the slurry to make an electrode plate; air-drying the electrode plate under a room temperature, and moving the electrode plate into a 120° C. oven to keep drying for 1 hour, and then performing cold calendering and slitting to obtain a positive electrode plate.

(3) Preparing a Negative Electrode Plate

Lithium metal of 25 μm in thickness is affixed to the surface of a copper foil, and then the copper foil is cold-calendered and slitted to obtain a negative electrode plate.

(4) Preparing a Pouch-Type Battery

A method for preparing a pouch-type battery includes: using polypropylene film of 12 μm in thickness as a separator, and sequentially stacking the NCM811 positive electrode plate, the separator, and the lithium negative electrode plate in such a way that the separator is located between the positive electrode plate and the negative electrode plate to serve an isolation function; and wrapping the stacked materials with an aluminum laminated film, moving the materials to a vacuum oven to dry at 120° C. until the moisture content reaches 10 mg/Ah, then injecting the electrolytic solution at an injection volume of 2 g/Ah, and performing sealing to obtain a pouch-type battery whose capacity is 1 ampere hour (Ah).

Embodiment 2

The preparation process of the lithium metal battery in this embodiment is the same as that in Embodiment 1, but differs in: the content of the sultam additive in the electrolytic solution changes from 5% to 0.5%, and the battery is dried until the moisture content is 1 mg/Ah.

Embodiment 3

The preparation process of the lithium metal battery in this embodiment is the same as that in Embodiment 1, but differs in: the content of the sultam additive in the electrolytic solution changes from 5% to 3%, and the battery is dried until the moisture content is 6 mg/Ah.

Embodiment 4

The preparation process of the lithium metal battery in this embodiment is the same as that in Embodiment 1, but differs in: the content of the sultam additive in the electrolytic solution changes from 5% to 10%, and the battery is dried until the moisture content is 19 mg/Ah.

Embodiment 5

The preparation process of the lithium metal battery in this embodiment is the same as that in Embodiment 1, but differs in: the content of the sultam additive in the electrolytic solution changes from 5% to 15%, and the battery is dried until the moisture content is 29 mg/Ah.

Embodiment 6

The preparation process of the lithium metal battery in this embodiment is the same as that in Embodiment 1, but differs in: the battery is dried until the moisture content is 1 mg/Ah.

Embodiment 7

The preparation process of the lithium metal battery in this embodiment is the same as that in Embodiment 1, but differs in: the battery is dried until the moisture content is 5 mg/Ah.

Embodiment 8

The preparation process of the lithium metal battery in this embodiment is the same as that in Embodiment 1, but differs in: the battery is dried until the moisture content is 19 mg/Ah.

Embodiment 9

The preparation process of the lithium metal battery in this embodiment is the same as that in Embodiment 1, but differs in: the battery is dried until the moisture content is 95 mg/Ah.

Embodiment 10

The preparation process of the lithium metal battery in this embodiment is the same as that in Embodiment 1, but differs in: the injection volume of the electrolytic solution changes from 2 g/Ah to 0.5 g/Ah, and the battery is dried until the moisture content is 2 mg/Ah.

Embodiment 11

The preparation process of the lithium metal battery in this embodiment is the same as that in Embodiment 1, but differs in: the injection volume of the electrolytic solution changes from 2 g/Ah to 1 g/Ah, and the battery is dried until the moisture content is 5 mg/Ah.

Embodiment 12

The preparation process of the lithium metal battery in this embodiment is the same as that in Embodiment 1, but differs in: the injection volume of the electrolytic solution changes from 2 g/Ah to 3 g/Ah, and the battery is dried until the moisture content is 14 mg/Ah.

Embodiment 13

The preparation process of the lithium metal battery in this embodiment is the same as that in Embodiment 1, but differs in: the injection volume of the electrolytic solution changes from 2 g/Ah to 5 g/Ah, and the battery is dried until the moisture content is 24 mg/Ah.

Embodiment 14

The preparation process of the lithium metal battery in this embodiment is the same as that in Embodiment 1, but differs in: the electrolytic solution contains a FEC additive whose mass fraction is 5%.

Embodiment 15

The preparation process of the lithium metal battery in this embodiment is the same as that in Embodiment 1, but differs in: the positive active material changes from $LiNi_{0.8}Co_{0.1}Mn_{0.1}O_2$ (NCM811) to $LiFePO_4$.

Embodiment 16

The preparation process of the lithium metal battery in this embodiment is the same as that in Embodiment 1, but differs in: the positive active material changes from NCM811 to $LiCoO_2$.

Embodiment 17

The preparation process of the lithium metal battery in this embodiment is the same as that in Embodiment 1, but differs in: the positive active material changes from NCM811 to $LiNi_{0.8}Co_{0.5}Al_{1.5}O_2$ (NCA).

Embodiment 18

The preparation process of the lithium metal battery in this embodiment is the same as that in Embodiment 1, but differs in: the structural formula of the sultam additive in the electrolytic solution changes from Structural Formula II to Structural Formula III, and the battery is dried until the moisture content is 9 mg/Ah.

Structural Formula III

Embodiment 19

The preparation process of the lithium metal battery in this embodiment is the same as that in Embodiment 1, but differs in: the structural formula of the sultam additive in the electrolytic solution changes from Structural Formula II to Structural Formula IV, and the battery is dried until the moisture content is 8 mg/Ah.

Structural Formula IV

Embodiment 20

The preparation process of the lithium metal battery in this embodiment is the same as that in Embodiment 1, but differs in: the structural formula of the sultam additive in the electrolytic solution changes from Structural Formula II to Structural Formula V, and the battery is dried until the moisture content is 6 mg/Ah.

Structural Formula V

Embodiment 21

The preparation process of the lithium metal battery in this embodiment is the same as that in Embodiment 1, but differs in: the structural formula of the sultam additive in the electrolytic solution changes from Structural Formula II to Structural Formula VI, and the battery is dried until the moisture content is 6 mg/Ah.

Structural Formula VI

Embodiment 22

The preparation process of the lithium metal battery in this embodiment is the same as that in Embodiment 1, but differs in: the structural formula of the sultam additive in the electrolytic solution changes from Structural Formula II to Structural Formula VII, and the battery is dried until the moisture content is 7 mg/Ah.

Structural Formula VII

Embodiment 23

The preparation process of the lithium metal battery in this embodiment is the same as that in Embodiment 1, but differs in: the structural formula of the sultam additive in the electrolytic solution changes from Structural Formula II to Structural Formula VIII, and the battery is dried until the moisture content is 8 mg/Ah.

Structural Formula VIII

Embodiment 24

The preparation process of the lithium metal battery in this embodiment is the same as that in Embodiment 1, but differs in: the structural formula of the sultam additive in the electrolytic solution changes from Structural Formula II to Structural Formula IX, and the battery is dried until the moisture content is 5 mg/Ah.

Structural Formula IX

Embodiment 25

The preparation process of the lithium metal battery in this embodiment is the same as that in Embodiment 1, but differs in: the structural formula of the sultam additive in the electrolytic solution changes from Structural Formula II to Structural Formula X, and the battery is dried until the moisture content is 9 mg/Ah.

Structural Formula X

Embodiment 26

The preparation process of the lithium metal battery in this embodiment is the same as that in Embodiment 1, but differs in: the structural formula of the sultam additive in the electrolytic solution changes from Structural Formula II to Structural Formula XI, and the battery is dried until the moisture content is 9 mg/Ah.

Structural Formula XI

Embodiment 27

The preparation process of the lithium metal battery in this embodiment is the same as that in Embodiment 1, but differs in: the structural formula of the sultam additive in the electrolytic solution changes from Structural Formula II to Structural Formula XII, and the battery is dried until the moisture content is 8 mg/Ah.

Structural Formula XII

Embodiment 28

The preparation process of the lithium metal battery in this embodiment is the same as that in Embodiment 1, but differs in: the structural formula of the sultam additive in the electrolytic solution changes from Structural Formula II to Structural Formula XIII, and the battery is dried until the moisture content is 8 mg/Ah.

Structural Formula XIII

Embodiment 29

The preparation process of the lithium metal battery in this embodiment is the same as that in Embodiment 1, but differs in: the structural formula of the sultam additive in the electrolytic solution changes from Structural Formula II to Structural Formula XIV, and the battery is dried until the moisture content is 9 mg/Ah.

Structural Formula XIV

Embodiment 30

The preparation process of the lithium metal battery in this embodiment is the same as that in Embodiment 1, but differs in: the structural formula of the sultam additive in the electrolytic solution changes from Structural Formula II to Structural Formula XX, and the battery is dried until the moisture content is 7 mg/Ah.

Structural Formula XX

Embodiment 31

The preparation process of the lithium metal battery in this embodiment is the same as that in Embodiment 1, but differs in: the structural formula of the sultam additive in the electrolytic solution changes from Structural Formula II to Structural Formula XXI, and the battery is dried until the moisture content is 6 mg/Ah.

Structural Formula XXI

COMPARATIVE EMBODIMENTS

Comparative Embodiment 1

The preparation process of the lithium metal battery in this comparative embodiment is the same as that in Embodiment 1, but differs in: the electrolytic solution contains no sultam additive, and the battery is dried until no moisture content can be measured.

Comparative Embodiment 2

The preparation process of the lithium metal battery in this comparative embodiment is the same as that in Embodiment 1, but differs in: the electrolytic solution contains no sultam additive.

Comparative Embodiment 3

The preparation process of the lithium metal battery in this comparative embodiment is the same as that in Embodiment 1, but differs in: the battery is dried until no moisture content can be measured.

Performance tests are described below:

Measuring the moisture content of the positive electrode plate:

The trace moisture is measured by using a Karl Fischer Coulomb moisture meter, which is based on an electrochemical method. When a Karl Fischer reagent in an electrolytic cell of the moisture meter reaches equilibrium, a water-containing sample is injected. The water in the sample participates in the redox reaction of iodine and sulfur dioxide. In a case that pyridine and methanol exist, pyridine hydroiodic acid and pyridine methyl sulfate are generated. Iodine anions form iodine at the anode again, so that the redox reaction continues until all the water is consumed. According to Faraday's law of electrolysis, the amount of iodine produced by electrolysis is proportional to the amount of electricity consumed during the electrolysis.

Testing the Performance of the Lithium Metal Battery:

(1) Measuring a first-cycle specific discharge capacity and a first-cycle efficiency: The measurement method includes: charging the lithium metal battery at a constant current of 1.5 milliamperes per square centimeter (mA/cm$^2$) until the voltage reaches 4.25 V, then charging the battery at a constant voltage of 4.25 V until the current drops to 0.3 mA/cm$^2$ to obtain a first-cycle specific charge capacity ($C_{c1}$), and then discharging the battery at a constant current of 1.5 mA/cm$^2$ until the voltage reaches 3.0 V, so as to obtain a first-cycle specific discharge capacity ($C_{d1}$): First-cycle efficiency=first-cycle specific discharge capacity ($C_{d1}$)/first-cycle specific charge capacity ($C_{c1}$).

(2) Measuring a capacity retention rate: The measurement method includes: charging a lithium metal battery at a constant current of 1.5 mA/cm$^2$ until the voltage reaches 4.25 V, then charging the battery at a constant voltage of 4.25 V until the current drops to 0.3 mA/cm$^2$, and then discharging the battery at a constant current of 1.5 mA/cm$^2$ until the voltage reaches 3.0 V, so as to obtain a first-cycle specific discharge capacity ($C_{d1}$); and repeating the forgoing process until the battery is charged and discharged for n cycles, so as to obtain an n$^{th}$-cycle specific discharge capacity $C_{dn}$ of the lithium metal battery after n cycles: Capacity retention rate=n$^{th}$-cycle specific discharge capacity ($C_{dn}$)/first-cycle specific discharge capacity ($C_{d1}$).

(3) Observing the surface of the lithium metal negative electrode plate: disassembling the lithium metal battery that has been charged and discharged for 100 cycles, and observing the surface morphology of the lithium metal negative electrode plate through an optical microscope to check whether any lithium dendrites are generated.

TABLE 1

Parameters of the lithium metal battery in Embodiments 1~31 and Comparative Embodiments 1~3

| Serial number | Structure of sultam additive | Mass percent of sultam | Injection volume of electrolytic solution (g/Ah) | Positive active material | Moisture content of positive electrode plate (g/Ah) | Molar ratio of additive to moisture |
|---|---|---|---|---|---|---|
| Embodiment 1 | II | 5% | 2 | NCM811 | 0.010 | 1 |
| Embodiment 2 | II | 0.5% | 2 | NCM811 | 0.001 | 1 |
| Embodiment 3 | II | 3% | 2 | NCM811 | 0.006 | 1 |
| Embodiment 4 | II | 10% | 2 | NCM811 | 0.019 | 1 |
| Embodiment 5 | II | 15% | 2 | NCM811 | 0.029 | 1 |
| Embodiment 6 | II | 5% | 2 | NCM811 | 0.001 | 10 |
| Embodiment 7 | II | 5% | 2 | NCM811 | 0.005 | 2 |
| Embodiment 8 | II | 5% | 2 | NCM811 | 0.019 | 0.5 |
| Embodiment 9 | II | 5% | 2 | NCM811 | 0.095 | 0.1 |
| Embodiment 10 | II | 5% | 0.5 | NCM811 | 0.002 | 1 |
| Embodiment 11 | II | 5% | 1 | NCM811 | 0.005 | 1 |
| Embodiment 12 | II | 5% | 3 | NCM811 | 0.014 | 1 |
| Embodiment 13 | II | 5% | 5 | NCM811 | 0.024 | 1 |
| Embodiment 14 | II | 5% | 2 | NCM811 | 0.010 | 1 |
| Embodiment 15 | II | 5% | 2 | LiFePO$_4$ | 0.010 | 1 |
| Embodiment 16 | II | 5% | 2 | LiCoO$_2$ | 0.010 | 1 |
| Embodiment 17 | II | 5% | 2 | NCA | 0.010 | 1 |
| Embodiment 18 | III | 5% | 2 | NCM811 | 0.009 | 1 |
| Embodiment 19 | IV | 5% | 2 | NCM811 | 0.008 | 1 |
| Embodiment 20 | V | 5% | 2 | NCM811 | 0.006 | 1 |
| Embodiment 21 | VI | 5% | 2 | NCM811 | 0.006 | 1 |
| Embodiment 22 | VII | 5% | 2 | NCM811 | 0.007 | 1 |
| Embodiment 23 | VIII | 5% | 2 | NCM811 | 0.008 | 1 |
| Embodiment 24 | IX | 5% | 2 | NCM811 | 0.005 | 1 |
| Embodiment 25 | X | 5% | 2 | NCM811 | 0.009 | 1 |
| Embodiment 26 | XI | 5% | 2 | NCM811 | 0.009 | 1 |
| Embodiment 27 | XII | 5% | 2 | NCM811 | 0.008 | 1 |
| Embodiment 28 | XIII | 5% | 2 | NCM811 | 0.008 | 1 |
| Embodiment 29 | XIV | 5% | 2 | NCM811 | 0.009 | 1 |
| Embodiment 30 | XX | 5% | 2 | NCM811 | 0.007 | 1 |
| Embodiment 31 | XXI | 5% | 2 | NCM811 | 0.006 | 1 |
| Comparative Embodiment 1 | / | / | 2 | NCM811 | / | / |
| Comparative Embodiment 2 | / | / | 2 | NCM811 | 0.010 | / |
| Comparative Embodiment 3 | II | 5% | 2 | NCM811 | / | / |

TABLE 2

Performance evaluation for the lithium metal battery in Embodiments 1~31 and Comparative Embodiments 1~3

| Serial Number | Energy density (wh/kg) | First-cycle specific discharge capacity (mAh/g) | First-cycle efficiency (%) | $50^{th}$-cycle capacity retention rate (%) | $200^{th}$-cycle capacity retention rate (%) | Lithium dendrite |
|---|---|---|---|---|---|---|
| Embodiment 1 | 365 | 185 | 86.4 | 94.6 | 85.4 | None |
| Embodiment 2 | 371 | 188 | 89.2 | 90.4 | 79.8 | Slight |
| Embodiment 3 | 369 | 187 | 87.1 | 93.0 | 82.4 | None |
| Embodiment 4 | 355 | 180 | 79.6 | 91.7 | 81.1 | None |
| Embodiment 5 | 326 | 165 | 71.3 | 87.3 | 72.7 | None |
| Embodiment 6 | 371 | 188 | 86.5 | 87.8 | 78.2 | None |
| Embodiment 7 | 369 | 187 | 86.1 | 93.0 | 81.8 | None |
| Embodiment 8 | 353 | 179 | 80.2 | 91.6 | 82.1 | None |
| Embodiment 9 | 260 | 132 | 68.7 | 76.5 | 65.9 | Slight |
| Embodiment 10 | 423 | 185 | 87.8 | 95.1 | 24.3 | None |
| Embodiment 11 | 402 | 186 | 87.3 | 94.1 | 45.7 | None |
| Embodiment 12 | 335 | 180 | 83.5 | 93.3 | 84.4 | None |
| Embodiment 13 | 287 | 176 | 73.2 | 91.5 | 81.8 | None |
| Embodiment 14 | 363 | 184 | 83.8 | 97.3 | 89.1 | None |
| Embodiment 15 | 286 | 145 | 92.5 | 96.6 | 93.1 | None |
| Embodiment 16 | 306 | 155 | 87.8 | 91.0 | 82.6 | None |
| Embodiment 17 | 369 | 187 | 87.1 | 94.1 | 85.0 | None |
| Embodiment 18 | 361 | 183 | 86.1 | 94.5 | 85.2 | None |
| Embodiment 19 | 351 | 178 | 85.3 | 90.4 | 83.1 | None |
| Embodiment 20 | 361 | 183 | 86.3 | 96.7 | 90.2 | None |
| Embodiment 21 | 343 | 174 | 82.3 | 88.5 | 81.0 | None |
| Embodiment 22 | 357 | 181 | 86.1 | 95.6 | 83.4 | None |
| Embodiment 23 | 353 | 179 | 85.8 | 89.4 | 78.2 | None |
| Embodiment 24 | 355 | 180 | 85.7 | 91.7 | 79.4 | None |
| Embodiment 25 | 371 | 188 | 86.8 | 95.2 | 88.3 | None |
| Embodiment 26 | 363 | 184 | 86.4 | 94.6 | 87.0 | None |
| Embodiment 27 | 347 | 176 | 85.1 | 90.3 | 82.4 | None |
| Embodiment 28 | 345 | 175 | 84.3 | 92.6 | 85.1 | None |
| Embodiment 29 | 326 | 165 | 80.1 | 89.1 | 75.2 | None |
| Embodiment 30 | 365 | 185 | 86.8 | 94.6 | 84.9 | None |
| Embodiment 31 | 355 | 180 | 84.2 | 90.6 | 78.9 | None |
| Comparative Embodiment 1 | 355 | 180 | 83.8 | 80.6 | 60.6 | Too many |
| Comparative Embodiment 2 | 343 | 174 | 81.8 | 64.4 | 54.0 | Too many |
| Comparative Embodiment 3 | 365 | 185 | 80.6 | 89.2 | 73.5 | Slight |

Table 1 shows the following effects.

(1) In contrast to Comparative Embodiments 1~2, the sultam additive added in Embodiments 1~31 effectively improves the interface composition and the lithium plating morphology on the surface of the lithium metal negative electrode, effectively suppresses growth of lithium dendrites during cycles of the battery, and enhances the cycle performance of the battery.

(2) Embodiments 1~5 show that when the content of the sultam additive is low, a good surface film of the lithium negative electrode cannot be formed, and a slight lithium plating phenomenon is seen; however, when the content of the sultam additive is too high, the first-cycle efficiency of the battery is low, the resistance is high, and subsequent capacity attenuation of the battery is severer.

(3) Embodiments 1 and 6~9 and Comparative Embodiments 1~3 show that a relationship exists between the content of the sultone additive and the moisture content in the positive electrode plate. Existence of moisture whose molar percent is equal to that of the sultam additive in the positive electrode plate facilitates conversion of the sultam additive into $SO_2$ and improves the surface composition of the lithium metal. If the content of the sultam additive is too high, the resistance of the electrolyte interface film formed by the sultam additive is relatively high, and the subsequent attenuation is a little faster. If the moisture content in the positive electrode plate is too high, slight lithium plating is likely to occur, thereby deteriorating the performance of the electrolytic solution, the electrode plate, and the battery.

(4) Embodiments 1 and 10~13 show that, if the injection volume of the electrolytic solution is lower, the energy density of the battery will be higher, but an absolute content of the additive is lower and is unable to ensure sufficient electrolytic solution during cycles of the battery, and the cycle capacity attenuation is faster subsequently. If the injection volume of the electrolytic solution is too high, the energy density of the battery will be low, the absolute content of the additive and moisture will be high, thereby deteriorating the positive electrode and the electrolytic solution and increasing the resistance of the battery.

(5) Embodiments 1 and 14 show that some conventional functional additives help to further enhance the cycle performance of the lithium metal battery.

What is claimed is:

1. An electrolytic solution, comprising a lithium salt, an organic solvent, and an additive, wherein the additive comprises a sultam compound represented by Structural Formula I:

Structural Formula I wherein
R is selected from substituted or unsubstituted $C_1$ to $C_{10}$ hydrocarbyls, wherein a substituent is selected from a phenyl, $C_1$ to $C_6$ alkyls, or $C_1$ to $C_6$ alkenyls;
X is a sulfur atom or a phosphorus atom; and
$R_1$ and $R_2$ each are independently selected from an oxygen atom, a fluorine atom, a chlorine atom, a bromine atom, and substituted or unsubstituted $C_1$ to $C_{10}$ hydrocarbyls, wherein a substituent contains one or more of elements fluorine, chlorine, bromine, iodine, nitrogen, oxygen, sulfur, silicon, boron, and phosphorus; and both $R_1$ and $R_2$ are not oxygen atoms concurrently.

2. The electrolytic solution according to claim 1, wherein the additive comprises a sultam compound represented by Structural Formula I-1:

Structural Formula I-1 wherein, X is a phosphorus atom, and $R_1$ and $R_2$ each are independently selected from F, Cl, Br, or halogenated $C_1$ to $C_4$ hydrocarbyls,
or, X is a sulfur atom, $R_2$ is an oxygen atom, and $R_1$ is selected from F, Cl, Br, or halogenated or unsubstituted $C_1$ to $C_4$ hydrocarbyls; and
n is 1, 2, 3, or 4.

3. The electrolytic solution according to claim 1, wherein the additive comprises the sultam compound represented by Structural Formula I-1:

Structural Formula I-1 wherein, X is a phosphorus atom, and $R_1$ and $R_2$ each are independently selected from F, Cl, Br, or halogenated $C_1$ to $C_4$ hydrocarbyls,
or, X is a sulfur atom, $R_2$ is an oxygen atom, and $R_1$ is selected from F, Cl, Br, or halogenated $C_1$ to $C_4$ hydrocarbyls; and
n is 1, 2, or 3.

4. The electrolytic solution according to claim 1, wherein X is a phosphorus atom, and $R_1$ or $R_2$ is selected from F, —$CH_3$, —$C_2H_5$, —$C_3H_7$, —$C_4H_9$, —$CF_3$, —$C_2F_5$, linear —$C_3F_7$, linear —$C_4F_9$, —$CH_2CF_3$, and —$CH(CF_3)_2$; or X is a sulfur atom, $R_2$ is an oxygen atom, and $R_1$ is selected from F, —$CH_3$, —$C_2H_5$, —$C_3H_7$, —$C_4H_9$, —$CF_3$, —$C_2F_5$, linear —$C_3F_7$, linear —$C_4F_9$, —$CH_2CF_3$, and —$CH(CF_3)_2$.

5. The electrolytic solution according to claim 1, wherein X is a sulfur atom, R is —$CH_2CH_2$— or —$CH(Ph)CH_2$—, $R_2$ is an oxygen atom, and $R_1$ is F or Cl; or X is a phosphorus atom, R is —$CH_2CH_2$—, and $R_1$ and $R_2$ each are independently selected from F.

6. The electrolytic solution according to claim 1, wherein, based on a total mass of the electrolytic solution, a mass percent of the sultam compound in the electrolytic solution is 0.5% to 15%.

7. The electrolytic solution according to claim 1, wherein, based on the total mass of the electrolytic solution, a ratio of the content of the sultam compound to a content of the lithium salt is 0.04 to 0.06,
the content of the sultam compound is measured by a mass percent; and
the content of the lithium salt is measured by a molar concentration.

8. The electrolytic solution according to claim 1, wherein the electrolytic solution further contains a film-forming additive, and the film-forming additive is fluoroethylene carbonate.

9. The electrolytic solution according to claim 8, wherein a ratio of a content C1 of the sultam compound, a content C2 of the fluoroethylene carbonate, and a content L of the lithium salt satisfies the following relational expression:

$$38 \leq L(C1+C2)/C1C2 \leq 42;$$

wherein, C1 and C2 are measured by mass percent; and
L is measured by a molar concentration.

10. A lithium metal battery, comprising a positive electrode, an electrolytic solution, a negative electrode, and a separator located between the positive electrode and the negative electrode, wherein the electrolytic solution is the electrolytic solution according to claim 1, and the negative electrode comprises a lithium-containing metal material.

11. The lithium metal battery according to claim 10, wherein the lithium-containing metal material is metallic lithium or a lithium alloy.

12. The lithium metal battery according to claim 11, wherein the lithium alloy comprises one or more of a Li—Sn alloy, a Li—Sn—O alloy, a Li—Mg alloy, a Li—B alloy, and a Li—Al alloy.

13. The lithium metal battery according to claim 10, wherein a moisture content in the positive electrode plate is 1 mg/Ah to 100 mg/Ah, and a molar ratio of the sultam compound in the electrolytic solution to moisture in the positive electrode plate is 0.1:1 to 10:1.

14. The lithium metal battery according to claim 13, wherein the molar ratio of the sultam compound in the electrolytic solution to the moisture in the positive electrode plate is 0.8:1 to 1.2:1.

15. The lithium metal battery according to claim 10, wherein an injection volume of the electrolytic solution is 0.5 g/Ah to 5 g/Ah.

16. The lithium metal battery according to claim 15, wherein the injection volume of the electrolytic solution is 2 g/Ah to 3 g/Ah.

17. The lithium metal battery according to claim 10, wherein an electrolyte interface film on a surface of the lithium-containing metal material contains sulfate, sulfonate lithium salt, and polysulfonimide.

18. The lithium metal battery according to claim 10, wherein the positive electrode comprises a positive active material, and the positive active material is a lithium transition metal composite oxide.

19. A battery module, comprising the lithium metal battery according to claim 10.

20. A device, comprising the lithium metal battery according to claim 10.

\* \* \* \* \*